United States Patent
Van Der Tempel

(10) Patent No.: US 6,596,367 B2
(45) Date of Patent: Jul. 22, 2003

(54) OPTICAL DISC

(75) Inventor: Leendert Van Der Tempel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/955,854

(22) Filed: Sep. 19, 2001

(65) Prior Publication Data
US 2002/0048647 A1 Apr. 25, 2002

(30) Foreign Application Priority Data
Sep. 21, 2000 (EP) .......................................... 00203310

(51) Int. Cl.$^7$ ................................................. B32B 3/02
(52) U.S. Cl. ................. 428/64.1; 428/64.4; 430/270.11
(58) Field of Search ........................ 428/64.1, 64.4, 428/457, 913; 430/270.11, 495.1, 945

(56) References Cited

U.S. PATENT DOCUMENTS 5,846,626 A * 12/1998 Kashwagi .................. 428/64.1

FOREIGN PATENT DOCUMENTS

| EP | 0724259 A2 | 7/1996 | ............ G11B/7/24 |
| EP | 0729141 A2 | 8/1996 | ............ G11B/7/24 |
| WO | 0116947 A1 | 8/2001 | ............ G11B/7/004 |

* cited by examiner

Primary Examiner—Elizabeth Mulvaney
(74) Attorney, Agent, or Firm—Michael E. Belk

(57) ABSTRACT

The invention relates to an optical disc consisting of a synthetic resin substrate provided with readable information in a layer. The moisture-proof layer is arranged between the synthetic resin substrate and a second synthetic resin layer. A suitable choice of the position of the layer, that is the ratio θ between the thickness of the second synthetic resin layer and the total thickness of the optical disc, enables the absolute maximum concentration moment (CM) or warpage of the optical disc to fall within a fixed range when the humidity of the environment changes. This range preferably lies between a small positive value and a small negative value.

10 Claims, 1 Drawing Sheet

OPTICAL DISC

Figure 1:
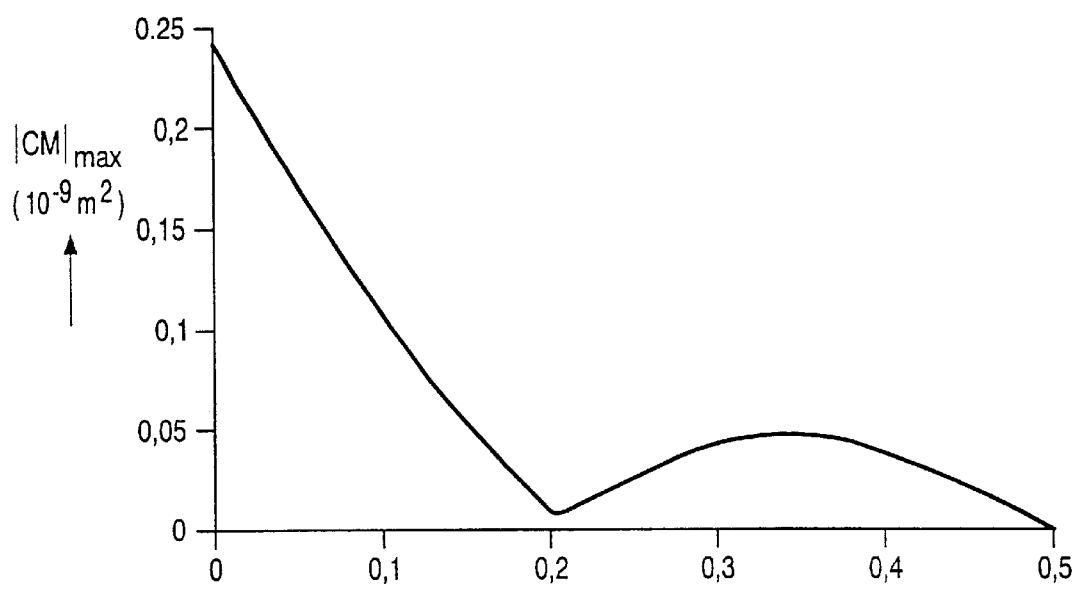

The invention relates to an optical disc comprising a synthetic resin substrate provided with readable information, a moisture-proof layer and a second synthetic resin layer, said moisture-proof layer being situated between the synthetic resin substrate and the second synthetic resin layer.

Such optical discs are known per se, in particular from, for example, U.S. Pat. Nos. 5,490,131 and 6,051,298. A compact disc (hereinafter referred to as CD) and a digital video disc (hereinafter referred to as a DVD) are examples of an optical disc which can be considered to be a customary optical information medium. The commercially available optical disc comprises a synthetic resin substrate which is successively provided with holes wherein information is stored, a reflection film covering these holes of the substrate of the disc, and a protective film formed on the reflection film, which reflection film can be considered to be a moisture-proof layer. More particularly, a CD is composed, in practice, of an approximately 0.05 micrometer thick reflection film covering the holes in the approximately 1.2 mm thick substrate of the disc, the protective film being provided on the reflection film in a thickness of approximately 10 micrometers. A DVD for a double-sided information system comprises a disc-shaped substrate wherein the information is stored in the form of pits, which are covered by a reflection film on which, in certain embodiments, a protective film is provided. Such a DVD can be obtained, for example, by arranging two of said discs on top of each other, said two discs being bonded together on the side of the protective films by means of an adhesive layer. In another embodiment of a DVD, there is one information and reflection layer.

The method of manufacturing optical discs is known per se and employs certain processes, such as compression, injection, photopolymerization, and the like, the disc-shaped substrate generally being made from polycarbonate. The moisture-proof layer covering the holes in the disc-shaped substrate is obtained by means of, for example, vacuum evaporation or sputtering, and is customarily made from aluminum. The second synthetic resin layer serving as a protective film is applied in the form of a layer to the aluminum moisture-proof layer in order to protect this thin aluminum film against damage that may result from general physical contact and from oxidation of the reflection film. This protective layer is generally provided by means of a spin-coating process wherein a resin material is applied through a rotatory movement. Such optical discs are generally employed in an environment where the atmospheric humidity is subject to variation. Thus, the water vapor or moisture present in the ambient air will be able to penetrate the comparatively dry synthetic resin substrate and, as a result of the fluctuation of the humidity in the surrounding atmosphere, diffuse from said substrate until an equilibrium situation is reached. As a result of the presence of the moisture-proof layer, penetration of moisture from the side of the protective film into the synthetic resin substrate will hardly take place. Instead, moisture can only penetrate into or desorb from the substrate on the other side of the substrate, i.e. the side of the substrate where the light is incident, if the optical disc in question is a CD-type optical disc. In the case of a DVR-type optical disc, where the second synthetic resin layer is the side on which the light is incident, the above-mentioned situation will be the other way round. Absorption or desorption of moisture leads to differences in water concentration, thereby causing volume-change differences of the substrate causing warpage of said substrate. In the embodiment of the optical disc comprising a synthetic resin substrate, the substrate thus provided with an angle of curvature is positioned substantially obliquely with respect to the optical axis of the incident light ray. As a result, the light ray will not travel along the center of a groove, not even when the servomechanism is in operation, resulting in a deterioration of the signal quality. Besides, in the case of further warpage of the substrate, the servomechanism would become unsuitable, thereby rendering the disc temporarily unusable. Thus, an optical disc which is subject to warpage beyond the requirements imposed on the radial angle is temporarily unreadable.

It is an object of the invention to provide an optical disc which exhibits no, or little, warpage under the influence of moisture.

The invention, as mentioned in the opening paragraph, is characterized in accordance with the invention in that the location of the moisture-proof layer in the optical disc is such that the following general formula applies:

$$0.14 < \theta < 0.49$$

wherein:

$$\theta = \frac{\text{thickness of the second synthetic resin layer (mm)}}{\text{overall thickness optical disc (mm)}}$$

It is to be noted that the term "moisture-proof layer" used in the opening paragraph does not only comprise a single layer but also a so-called stack or packet of such layers, for example of metal, $ZnS-SiO_2$, phase-change material and $ZnS-SiO_2$. In the opening paragraph, such a stack or layer packet is to be considered to be a moisture-proof layer. In addition, it is possible that, in certain embodiments, the optical disc comprises two readable information layers, which are separated from each other by a so-called spacer. It will be clear that such an embodiment falls under the scope of protection of the invention, wherein these two information layers are to be considered to be a composite information layer.

The inventor has scrutinized the sensitivity of optical discs with respect to warpage caused by changes in the moisture content, and has surprisingly found that, if an optical disc meets the above-mentioned general equation, the angle of curvature of an optical disc can be minimized by the correct choice of the location of the moisture-proof layer in the optical disc.

It is particularly preferable for the location of the moisture-proof layer in the optical disc to be chosen such that the following general formula is met:

$$0.16 < \theta < 0.33$$

By suitably choosing the value of $\theta$, an optical disc is obtained wherein the positive and the negative moment through, respectively, the substrate and the second synthetic resin layer largely compensate each other.

In the annexed FIG. 1, the absolute maximum concentration moment (CM) is shown as a function of the parameter $\theta$.

Figure 2:
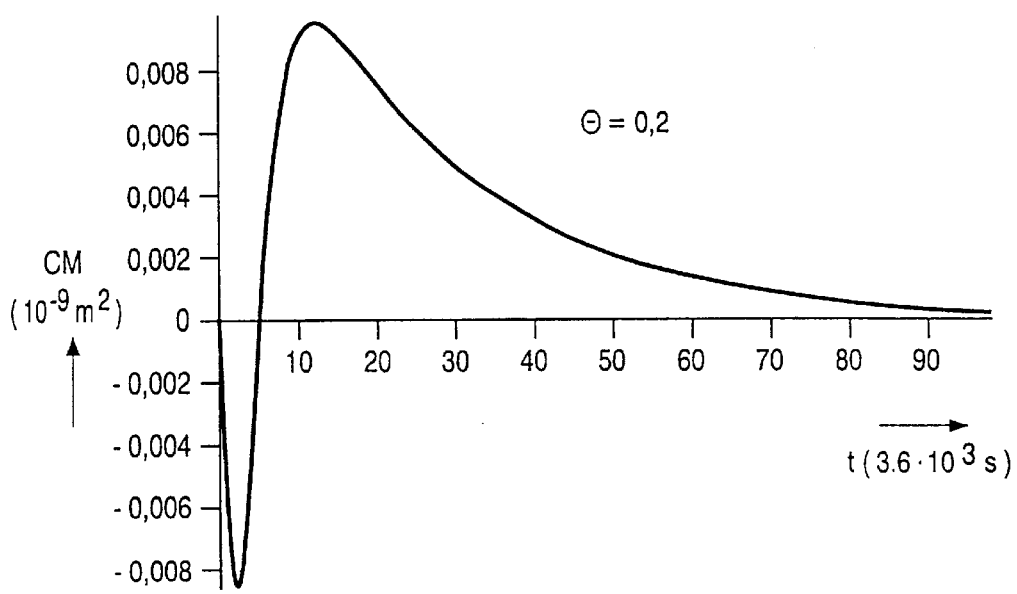

In the annexed FIG. 2, the concentration moment is shown as a function of time for a value of $\theta=0.2$. FIG. 2 shows that the positive and the negative concentration moment substantially neutralize each other around $\theta=0.2$, and that the minimum and the maximum are approximately equal in absolute value.

It is particularly preferred that the optical disc, as mentioned in the opening paragraph, is characterized in that the absolute values of maximum warpage and minimum warpage obtained from the time-dependent warpage measured at the different moisture levels meet the following equation:

$$0.1 < \frac{|K_{\min}|}{|K_{\max}|} < 10$$

wherein:

$|K_{\min}|$ = absolute value of minimum warpage, and $|K_{\max}|$ = absolute value of maximum warpage.

It is particularly preferable for $\frac{|K_{\min}|}{|K_{\max}|} \approx 1$.

The invention will be explained hereinafter by means of an example; it is to be noted, however, that the invention is not limited to such a specific example and is limited only by the scope of protection of the annexed claims.

Comparative Example 1

A commercially available compact disc, comprising an 1.2 mm thick substrate of polycarbonate provided on one side with an information layer, a 0.05 micrometer thick aluminum reflection layer, and an approximately 10 micrometer thick resin layer serving as the second synthetic resin layer is examined for the influence of moisture. After having been stored in a space at a specific relative humidity for a long period of time, which period is chosen to be such that the degree of air humidity in the optical disc reaches the equilibrium concentration, the disc is subsequently transferred to a space with a different relative humidity, leading to warpage of the disc, whereafter the maximum warpage is measured as a function of time. The maximum time-dependent angle of curvature is 0.29°. The θ value is approximately 0.008.

Comparative Example 2

A DVR-type optical disc, which comprises an approximately 1.1 mm thick polycarbonate substrate provided with an information layer, which information layer is coated with a 0.05 micrometer thick reflection layer which, in turn, is provided with a 0.1 mm thick second synthetic resin layer of polycarbonate, is subjected to moisture under the same conditions as described in comparative example 1. After a relative humidity step, the DVR-type optical disc exhibits approximately 0.15° warpage. The θ value is approximately 0.083.

EXAMPLE 1

A DVR-type optical disc, as used in the comparative example 2, is manufactured, with the exception that the thickness of the second synthetic resin layer is changed from 0.1 mm to 0.25 mm. This disc is subjected to moisture under the same conditions as described in comparative example 2, and the measured maximum time-dependent warpage after the relative humidity step is approximately 0°. The θ value is approximately 0.185.

EXAMPLE 2

A DVR-type optical disc, as used in the comparative example 2, is manufactured, with the exception that only the customary thickness of the polycarbonate substrate is changed from 1.1 mm to a substrate thickness of 0.4 mm. This DVR disc is subjected to variable degrees of humidity under the same conditions as described in comparative example 2, and the results of the time-dependent warpage measurement show that no substantial warpage has occurred. The θ value is approximately 0.20.

What is claimed is:

1. An optical disc comprising a synthetic resin substrate provided with readable information, a moisture-proof layer and a second synthetic resin layer, said moisture-proof layer being situated between the synthetic resin substrate and the second synthetic resin layer, wherein the moisture-proof layer comprises a stack having more than one layer, and wherein the location of the moisture-proof layer in the optical disc is such that the following general formula applies:

0.14<θ<0.49 wherein:

$$\theta = \frac{\text{thickness of the second synthetic resin layer (mm)}}{\text{overall thickness of the optical disc (mm)}}.$$

2. The optical disc of claim 1, wherein the moisture-proof layer comprises aluminum.

3. The optical disc of claim 1, wherein the substrate comprises two readable information layer separated by a spacer.

4. An optical disc comprising a synthetic resin substrate containing readable information, a moisture-proof layer and a second synthetic resin layer, the moisture-proof layer being situated between the synthetic resin substrate and the second synthetic resin layer, wherein the absolute values of maximum warpage and minimum warpage obtained from the time-dependent warpage measured at different moisture levels meet the following equation:

$$0.1 < \frac{|K_{\min}|}{|K_{\max}|} < 10$$

and wherein:

$|K_{\min}|$ = absolute value of minimum warpage, and $|K_{\max}|$ = absolute value of maximum warpage.

5. The optical disc of claim 4, characterized in that:

$$\frac{|K_{\min}|}{|K_{\max}|} \approx 1.$$

6. An optical disc comprising a synthetic resin substrate provided with readable information, a moisture-proof layer and a second synthetic resin layer, said moisture-proof layer being situated between the synthetic resin substrate and the second synthetic resin layer, wherein the location of the moisture-proof layer in the optical disc is such that the following general formula applies:

0.16<θ<0.33 wherein:

$$\theta = \frac{\text{thickness of the second synthetic resin layer}}{\text{overall thickness of the optical disc}}.$$

7. The optical disc of claim 6, wherein the moisture-proof layer comprises aluminum.

8. The optical disc of claim 6, wherein the substrate comprises two readable information layer separated by a spacer.

9. The optical disc of claim 6, wherein θ≈0.2.

10. An optical disc comprising a synthetic resin substrate provided with readable information, moisture-proof layer and a second synthetic resin layer, said moisture-proof layer being situated between the synthetic resin substrate and the second synthetic resin layer, wherein the substrate comprises two readable information layer separated by a spacer, and wherein the location of the moisture-proof layer in the optical disc is such that the following general formula applies:

$$0.14 < \theta < 0.49$$

wherein:

$$\theta = \frac{\text{thickness of the second synthetic resin layer}}{\text{overall thickness of the optical disc}}.$$

* * * * *